(12) United States Patent
Hikita et al.

(10) Patent No.: US 6,747,546 B1
(45) Date of Patent: Jun. 8, 2004

(54) DATA COMMUNICATION TRANSPONDER AND COMMUNICATIONS SYSTEM EMPLOYING IT

(75) Inventors: Junichi Hikita, Kyoto (JP); Haruo Taguchi, Kyoto (JP); Yoshihiro Ikefuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/513,164

(22) Filed: Feb. 25, 2000

(30) Foreign Application Priority Data

Feb. 26, 1999 (JP) .......................... 11-049678

(51) Int. Cl.[7] .................. H04Q 5/22; G05B 19/00; G06F 7/04; G08B 29/00; H04B 1/00
(52) U.S. Cl. .................. 340/10.31; 340/5.21; 340/5.4
(58) Field of Search ............... 340/5.21, 5.22, 340/5.4, 5.41, 5.54, 5.8, 5.81, 5.86, 10.31, 10.51, 10.52, 5.65, 825.77; 713/169; 709/229, 219

(56) References Cited

U.S. PATENT DOCUMENTS

| 4,734,568 | A | | 3/1988 | Watanabe |
|---|---|---|---|---|
| 5,225,664 | A | * | 7/1993 | Iijima ........................ 235/380 |
| 5,390,252 | A | * | 2/1995 | Suzuki et al. ................. 380/23 |
| 5,544,246 | A | * | 8/1996 | Mandelbaum et al. ........ 380/23 |
| H1606 | H | * | 11/1996 | Gelnovatch et al. ........ 340/505 |
| 5,613,214 | A | * | 3/1997 | Shirasawa et al. ......... 455/54.1 |
| 5,940,512 | A | * | 8/1999 | Tomoike ...................... 380/25 |
| 6,058,477 | A | | 5/2000 | Kusakabe et al. |
| 6,134,431 | A | * | 10/2000 | Matsumoto et al. ........ 455/411 |

FOREIGN PATENT DOCUMENTS

| EP | 0 332 117 | 9/1989 |
|---|---|---|
| EP | 0 332 117 A2 | 9/1989 |
| EP | 0 743 622 A2 | 11/1996 |
| JP | 10-327142 | 12/1998 |

OTHER PUBLICATIONS

Abstract of Japanese Patent Publ. No. 10327142; dated Dec. 8, 1998.

* cited by examiner

Primary Examiner—Michael Horabik
Assistant Examiner—Nam Nguyen
(74) Attorney, Agent, or Firm—Arent, Fox PLLC.

(57) ABSTRACT

An IC card 3 has an ID number ID0, for permitting itself to be identified, stored in memory provided therein. The IC card also has additional ID numbers ID1 to IDn stored in memory areas 17-1 to 17-n that are secured therein so as to be allocated to the individual providers that manage the reader/writers with which the IC card communicates. These additional ID numbers ID1 to IDn are used to prevent unauthorized use of the IC card, and are issued so as to be unique to the IC card by the individual providers that use the memory areas 17-1 to 17-n. Thus, the additional ID numbers ID1 to IDn differ from one IC card to another.

14 Claims, 11 Drawing Sheets

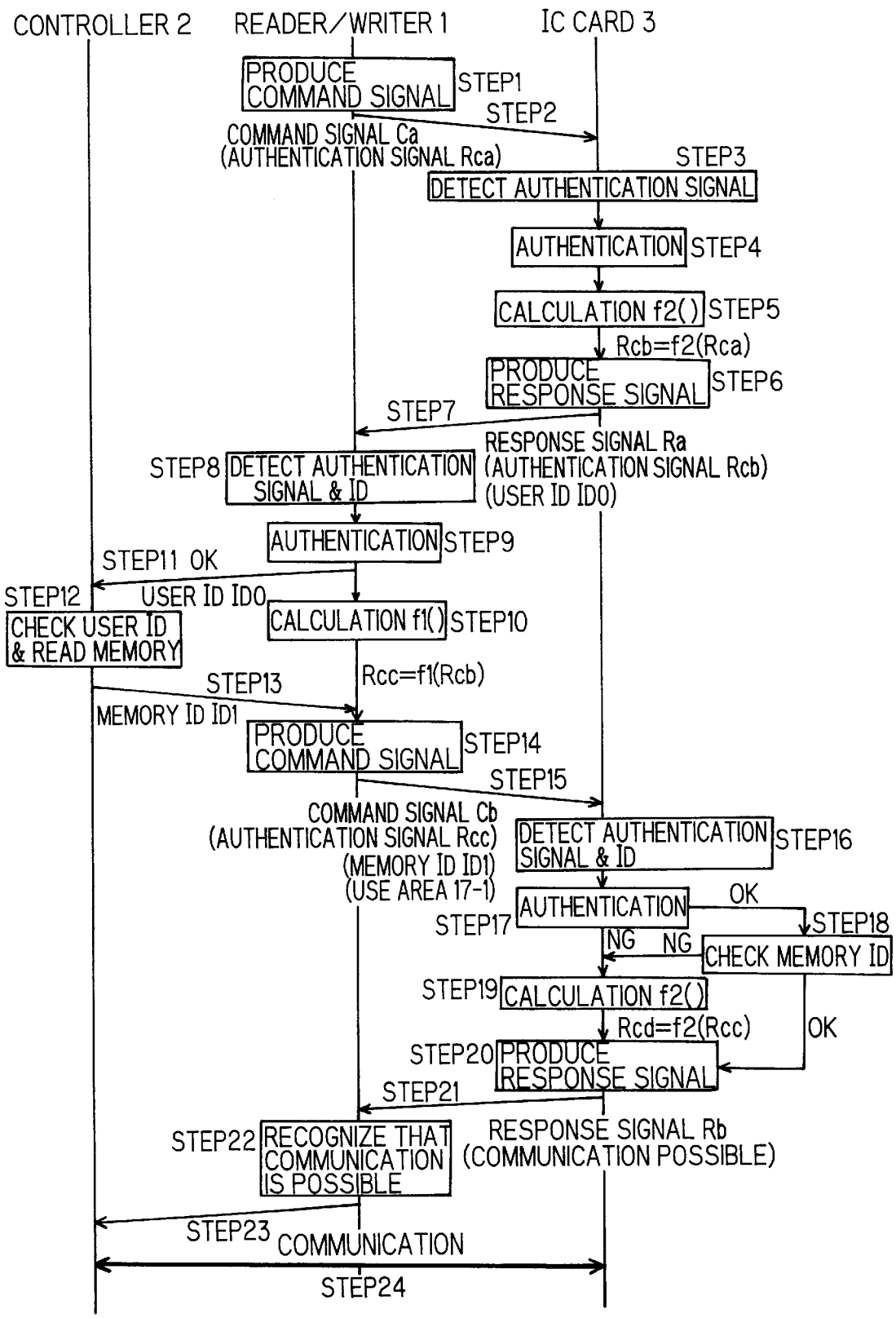

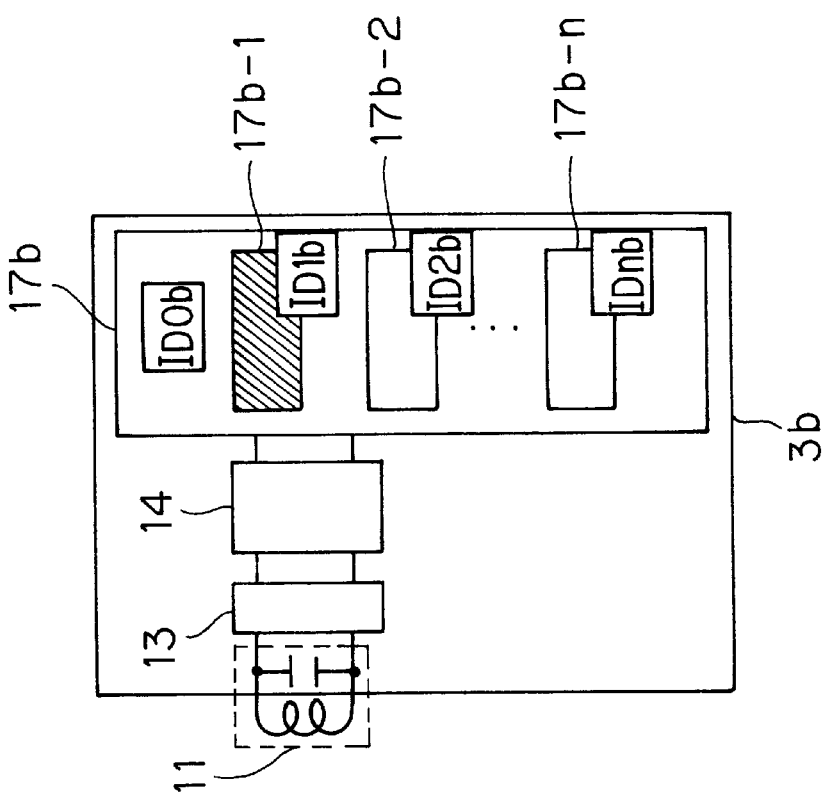
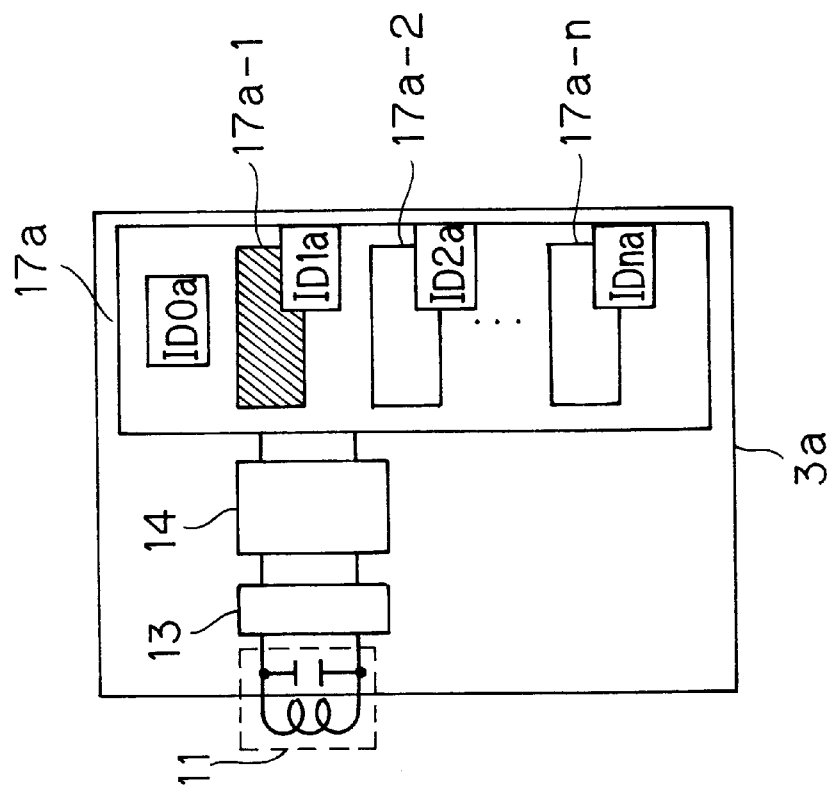

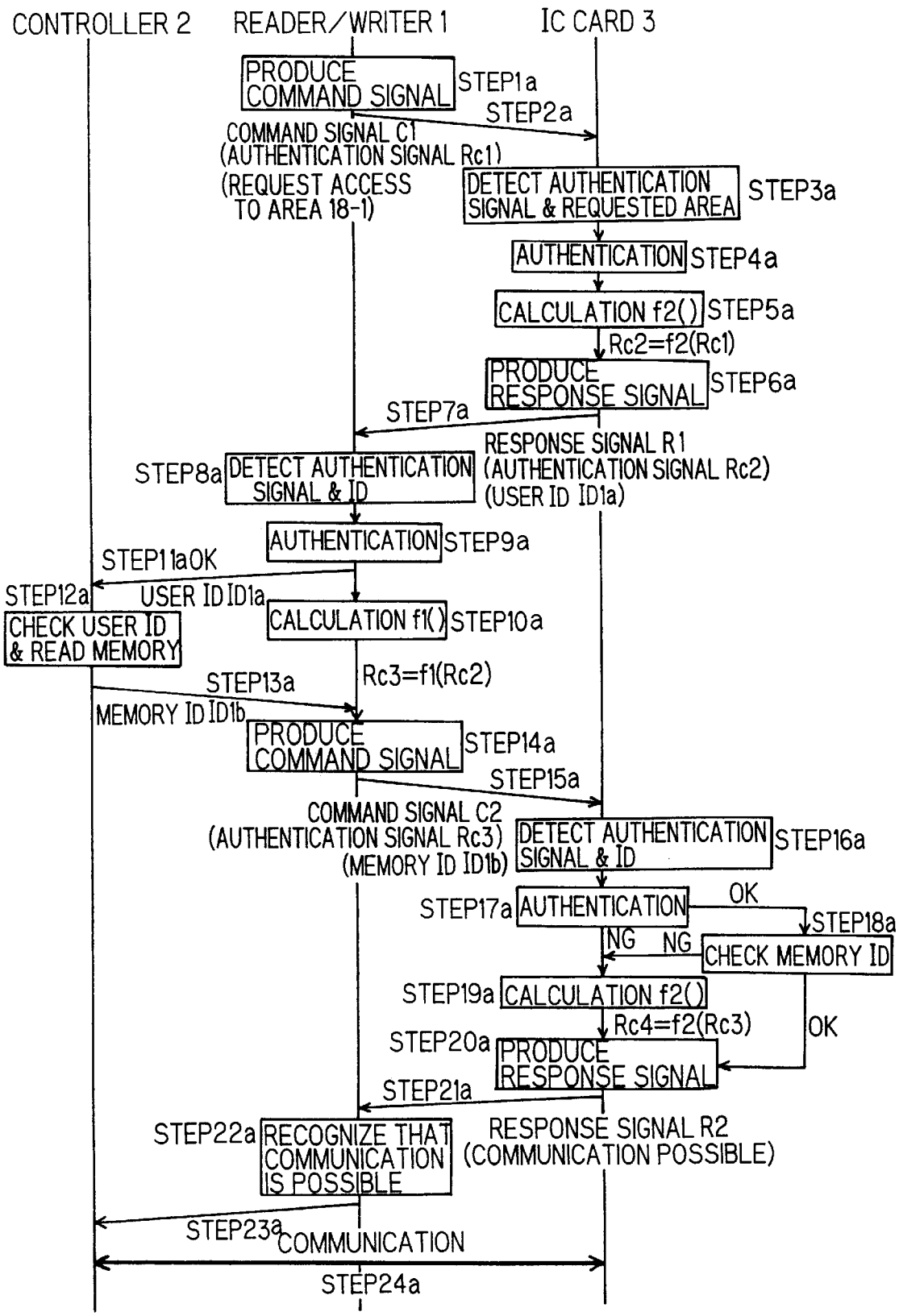

DATA COMMUNICATION TRANSPONDER AND COMMUNICATIONS SYSTEM EMPLOYING IT

BACKGROUND OF THE INVENTION

1. Field of the Invention

The present invention relates to a data communication transponder, such as a radio-wave tag or IC card, and a communications system employing such a transponder, and in particular to a data communication transponder having a plurality of data storage areas for use in communicating with interrogators of a plurality of providers and a communications system employing such a transponder.

2. Description of the Prior Art

Nowadays, communications systems are known that permit a single IC card, used as a transponder, to communicate with a plurality of types of reader/writer (interrogator) managed individually by a number of providers. To realize such a communications system, an IC card employed therein has memory divided into a plurality of memory areas allocated individually to a number of providers in order to achieve separate storage of data in communicating with the reader/writers managed individually by those providers. In this system, where a single IC card can communicate with reader/writers managed individually by a number of providers, it is essential, during communication, to permit the use of only a particular memory area allocated to the provider that manages the reader/writer with which a given IC card is currently communicating and simultaneously prohibit the use of the other memory areas.

To achieve this, each IC card has a plurality of cipher keys stored therein that permit the individual memory areas to be used only when communicating with the reader/writers managed by the corresponding providers to which those memory areas are allocated. An IC card and a reader/writer authenticate each other by the use of such a cipher key. A non-contact communications system involving such a mutual authentication process is proposed in Japanese Laid-Open Patent Application No. H10-327142.

In the communications system proposed in Japanese Laid-Open Patent Application No. H10-327142 mentioned above, as shown in FIG. 11, the cipher keys that are used to permit the use of the individual memory areas secured within an IC card are determined provider by provider. Moreover, once a particular provider is authenticated by the use of the corresponding cipher key, the IC card can recognize, on the basis of the same cipher key, which memory area the provider will request access to. On the other hand, a reader/writer can check whether a given IC card is authentic or not, but cannot identify it (i.e. cannot distinguish one IC card from another). Therefore, to permit reader/writers to identify IC cards, each IC card has also an ID (identification) number unique thereto stored therein.

However, in this system, the cipher keys that are used to permit the use of the memory areas secured within an IC card are determined provider by provider as described above, and thus those cipher keys are not unique to the IC card. Moreover, the ID number stored in an IC card is issued when the IC card is manufactured, and therefore the ID number, at the same time as it is stored in the IC card, needs to be registered also in individual providers. Thus, every time an IC card is manufactured, its ID number needs to be registered in individual providers. This complicates the management of the communications system.

SUMMARY OF THE INVENTION

An object of the present invention is to provide a data communication transponder and a communications system employing such a transponder that offer higher security by permitting cipher keys, used to permit the use of memory areas secured within an IC card, to be so determined as to be unique to the IC card.

To achieve the above object, according to one aspect of the present invention, a transponder for data communication is provided with: a plurality of storage areas for storing data used when the transponder communicates individually with a plurality of interrogators managed by different parties; a plurality of key signals, unique to the transponder and stored one for each of the storage areas, for permitting the use of only a particular storage area corresponding to the interrogator with which the transponder is currently communicating. Here, the transponder, when communicating with an interrogator, checks the key signal received from the interrogator against the key signals stored in the transponder and, when the received key signal coincides with one of the stored key signals, the transponder is permitted to communicate with the interrogator by using only a particular storage area corresponding to that interrogator.

In this transponder for data communication, the providers that manage the interrogators that can communicate with the transponder determine the cipher keys, which are used when the transponder communicates with the interrogators, in such a way that those cipher keys are unique to the transponder. When the transponder, having the cipher keys determined in this way, attempts to communicate with one of the interrogators, the interrogator can identify the transponder.

According to another aspect of the present invention, a non-contact communications system is provided with: a plurality of interrogators that are managed by different parties; and a transponder for data communication having a plurality of storage areas for storing data used when the transponder communicates individually with the interrogators and a plurality of key signals, unique to the transponder and stored one for each of the storage areas, for permitting the use of only a particular storage area corresponding to the interrogator with which the transponder is currently communicating. Here, the transponder, when communicating with an interrogator on a non-contact basis, checks the key signal received from the interrogator against the key signals stored in the transponder and, when the received key signal coincides with one of the stored key signals, the transponder is permitted to communicate with the interrogator by using only a particular storage area corresponding to that interrogator.

In this communications system, the providers that manage the interrogators that can communicate with the transponder determine the cipher keys, which are used when the transponder communicates with the interrogators, in such a way that those cipher keys are unique to the transponder. When the transponder, having the cipher keys determined in this way, attempts to communicate with one of the interrogators, the interrogator can identify the transponder.

BRIEF DESCRIPTION OF THE DRAWINGS

This and other objects and features of the present invention will become clear from the following description, taken in conjunction with the preferred embodiments with reference to the accompanying drawings in which:

FIG. 2 is a time chart showing the operation of the communications system shown in FIG. 1;

FIGS. 4A and 4B are block diagrams showing the relationship between different IC cards employed in the communications system shown in FIG. 1;

FIG. 7 is a time chart showing the operation of the communications system shown in FIG. 6;

DESCRIPTION OF THE PREFERRED EMBODIMENTS

Figure 1:
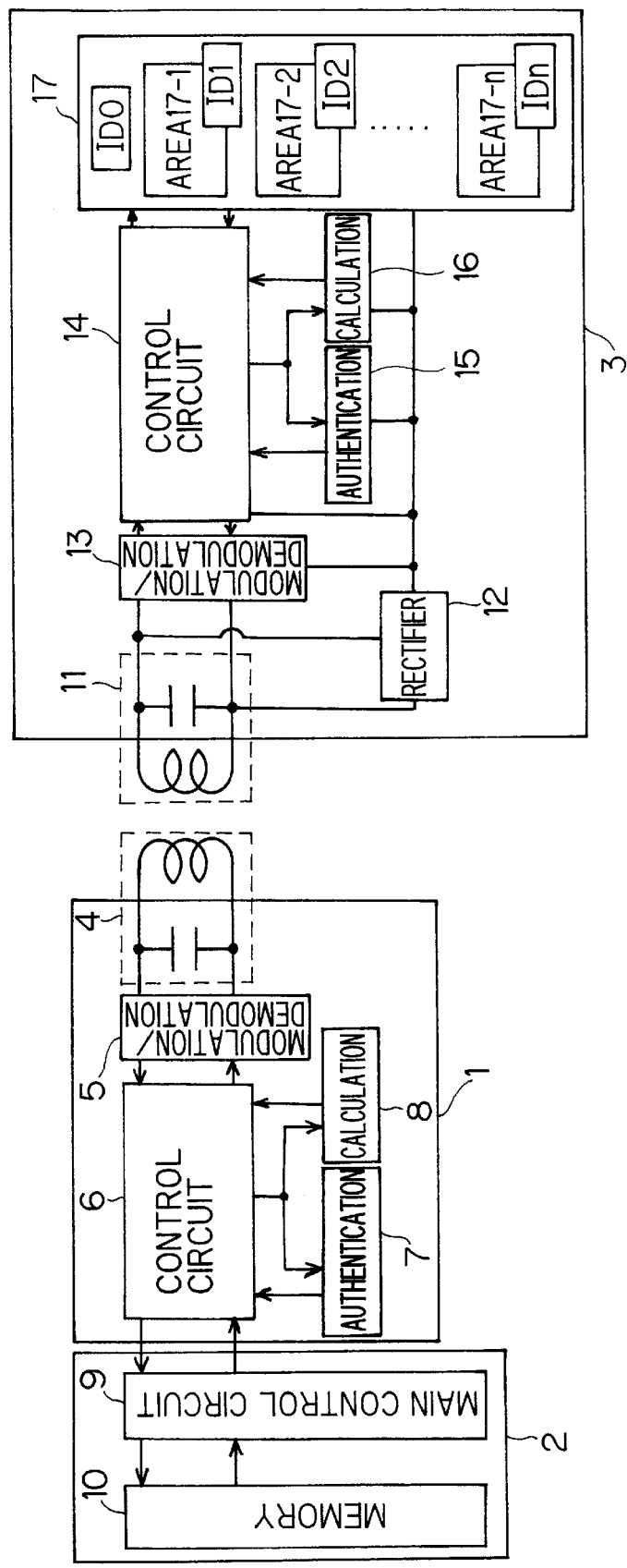
FIG. 1 is a block diagram showing the configuration of the communications system of a first embodiment of the invention.

First, a first embodiment of the present invention will be described with reference to the drawings relevant thereto. FIG. 1 is a block diagram showing the configuration of the communications system of the first embodiment of the invention. FIG. 2 is a time chart showing the operation of the communications system of this embodiment. It is to be noted that, throughout the present specification, the symbol "NG" indicates that an authentication process has found a communication partner to be not authentic, and that the symbol "OK" indicates that an authentication process has found a communication partner to be authentic.

The communications system shown in FIG. 1 has a reader/writer 1 and a controller 2 that together function as an interrogator and an IC card 3 that functions as a transponder. In this communications system, the reader/writer 1 is composed of a tuning circuit 4 that exchanges signals with the IC card 3, a modulation/demodulation circuit 5 that demodulates a response signal received by the tuning circuit 4 and that modulates a command signal produced by a control circuit 6, a control circuit 6 that produces a command signal, an authentication circuit 7 that receives from the control circuit 6 an authentication signal added to the received response signal and that authenticates the IC card 3 on the basis of the authentication signal, and a calculation circuit 8 that receives from the control circuit 6 the authentication signal added to the received response signal and that performs a predetermined calculation operation f1( ) on the authentication signal. This reader/writer 1 is controlled by the controller 2 that communicates therewith. The controller 2 has a main control circuit 9 that exchanges signals with the control circuit 6 of the reader/writer 1 and that controls the reader/writer 1, and a memory 10 for storing the ID number of and the information related to the owner of the IC card 3.

On the other hand, the IC card 3 is composed of a tuning circuit 11 that exchanges signals with the reader/writer 1, a rectifier circuit 12 that produces a source voltage to be supplied to the individual blocks of the IC card 3 by rectifying the signal tuned in by the tuning circuit 11, a modulation/demodulation circuit 13 that demodulates a command signal received by the tuning circuit 11 and that modulates a response signal produced by a control circuit 14, a control circuit 14 that produces a response signal, an authentication circuit 15 that receives from the control circuit 14 an authentication signal added to the received command signal and that authenticates the reader/writer 1 on the basis of the authentication signal, a calculation circuit 16 that receives from the control circuit 14 the authentication signal added to the received command signal and that performs a predetermined calculation operation f2( ) on the authentication signal, and a memory 17 for storing the ID number of and the information related to the owner of the IC card 3.

Figure 3A:
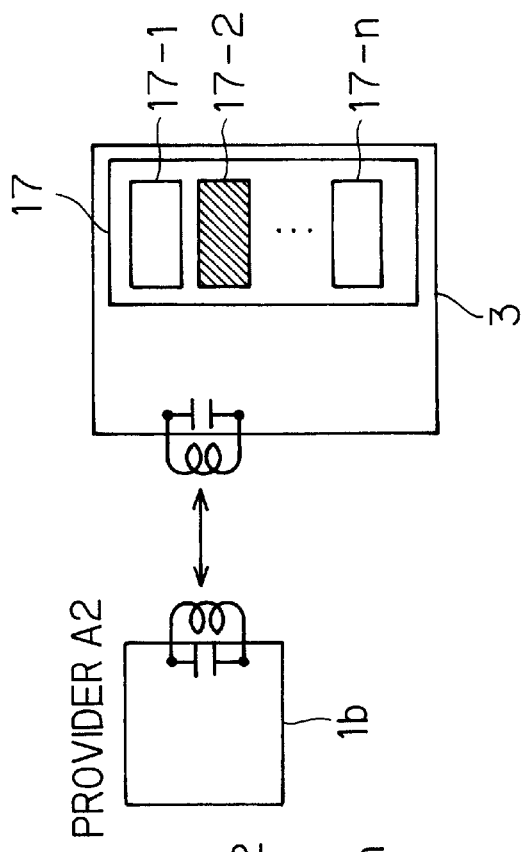
FIGS. 3A and 3B are block diagrams showing the relationship between the providers that manage the reader/writers and the memory areas secured within the IC card employed in the communications system shown in FIG. 1.
Figure 3B:
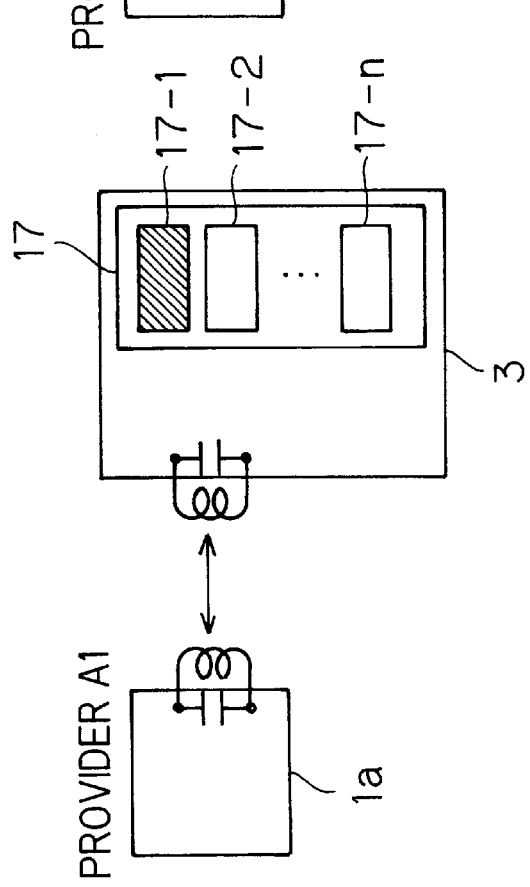

This IC card 3 can communicate with a plurality of reader/writers that are managed individually by different providers. To achieve this, the IC card 3 has its memory 17 divided into memory areas 17-1 to 17-n that are allocated for access from the individual providers. Specifically, as shown in FIG. 3A, when the reader/writer 1a managed by a provider A1 is permitted to communicate with the IC card 3, data communication is achieved by reading data from and writing data to one memory area 17-1 secured within the IC card 3, and, as shown in FIG. 3B, when the reader/writer 1b managed by a provider A2 is permitted to communicate with the IC card 3, data communication is achieved by reading data from and writing data to another memory area 17-2 secured within the IC card 3.

Also stored in the memory 17 are ID numbers (hereinafter the "memory IDs") ID1 to IDn that are used to permit access to the memory areas 17-1 to 17-n and another ID number (hereinafter the "user ID") ID0 that is used to permit each IC card 3 to be identified by the providers. Of these ID numbers ID0 to IDn, which are all determined so as to be unique to each IC card 3, the user ID ID0 is determined by the manufacturer when the IC card 3 is manufactured, and the memory IDs ID1 to IDn are determined by the individual providers. Specifically, if, as shown in FIG. 4A, the ID numbers that are stored in the memory 17a of one IC card 3a are ID0a and ID1a to IDna, then, as shown in FIG. 4B, the ID numbers that are stored in the memory 17b of another IC card 3b are ID0b and ID1b to IDnb, i.e. different values from ID0a and ID1a to IDna.

Figure 5:
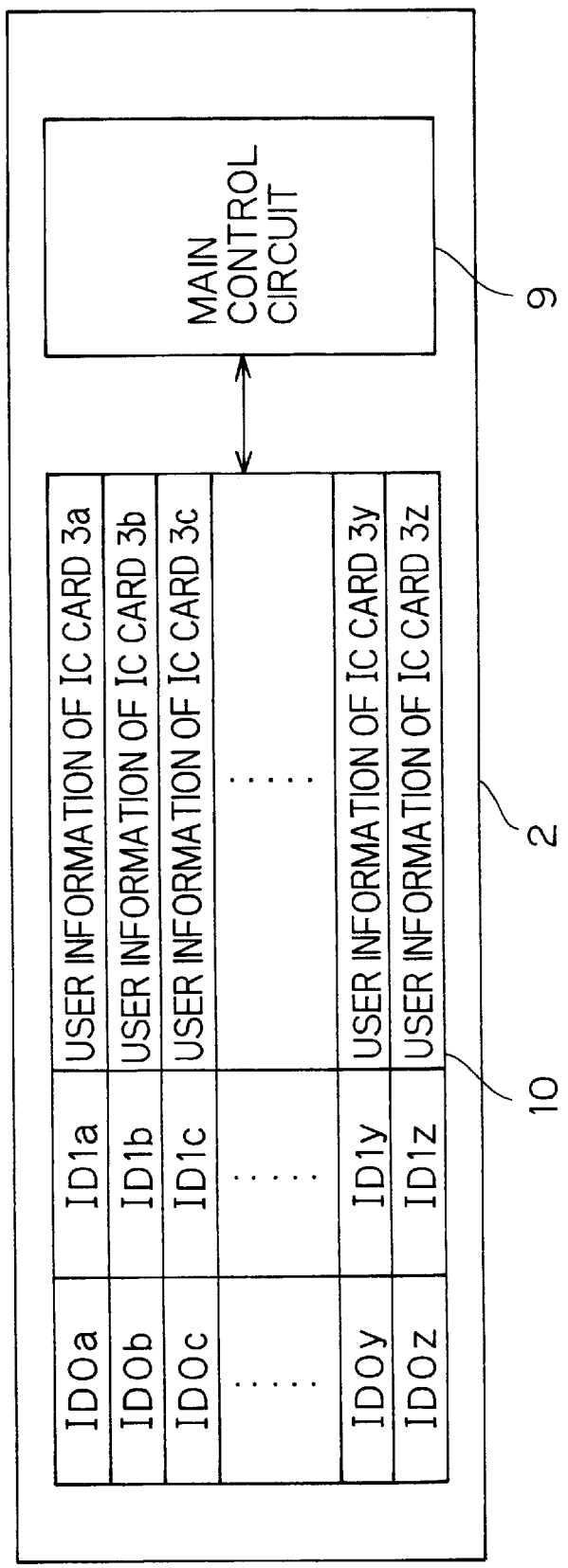
FIG. 5 is a block diagram showing the internal configuration of the controller and the memory employed in the communications system shown in FIG. 1.

Moreover, if it is assumed that the provider A, when communicating with the IC card 3a, uses the memory area 17a-1 and, when communicating with the IC card 3b, uses the memory area 17b-1, then, as shown in FIG. 5, in the memory 10 of the controller 2 managed by the provider A, the user ID ID0a of the IC card 3a, the memory ID ID1a of the memory area 17a-1, and the user information of the IC card 3a are stored as one set of mutually related data, and the user ID ID0b of the IC card 3b, the memory ID ID1b of the memory area 17b-1, and the user information of the IC card 3b are stored as another set of mutually related data.

In this communications system, as shown in FIG. 2, at predetermined intervals, the reader/writer 1 produces a command signal Ca that has an authentication signal (rolling code) Rca added thereto by the control circuit 6 so as to enable the IC card 3 to perform an authentication process (STEP 1). The thus produced command signal Ca is then modulated by the modulation/demodulation circuit 5, and is then transmitted from the tuning circuit 4 to the IC card 3 (STEP 2). Here, the authentication signal Rca that is added to the command signal Ca is an arbitrary signal that has not yet been subjected to the calculation operation f1( ) by the calculation circuit 8.

When the IC card 3 receives this command signal Ca through its tuning circuit 11, the rectifier circuit 12 produces a source voltage therefrom, and the modulation/demodulation circuit 13 demodulates and feeds it to the control circuit 14. The control circuit 14, on detecting the authentication signal Rca added to the command signal Ca, feeds the authentication signal Rca to the authentication circuit 15 to check whether or not this authentication signal Rca has already been subjected to the calculation operation f1( ) within the reader/writer 1 (STEP 3). Here, since this authentication signal Rca has not yet been subjected to the calculation operation f1( ), the authentication process results in "NG", and thus the IC card 3 does not authenticate the reader/writer 1 (STEP 4).

At the same time, the authentication signal Rca detected by the control circuit 14 is fed to the calculation circuit 16 so as to be subjected to the calculation operation f2( ) (STEP 5). The signal f2(Rca) resulting from the calculation operation f2( ) performed by the calculation circuit 16 is, as an authentication signal Rcb, fed to the control circuit 14 so as to be added to a response signal Ra that will be transmitted to the reader/writer 1. Moreover, the control circuit 14 adds to this response signal Ra the data of the user ID ID0 stored in the memory 17 (STEP 6). The response signal Ra thus produced is modulated by the modulation/demodulation circuit 13, and is then transmitted from the tuning circuit 11 to the reader/writer 1 (STEP 7).

When the reader/writer 1 receives this response signal Ra through its tuning circuit 4, the modulation/demodulation circuit 5 demodulates and feeds it to the control circuit 6. The control circuit 6 detects the authentication signal Rcb and the user ID ID0 added to the response signal Ra (STEP 8), and then feeds the authentication signal Rcb to the authentication circuit 7 to check whether or not this authentication signal Rcb has already been subjected to the calculation operation f2( ) within the IC card 3. Here, since the authentication signal Rcb=f2(Rca) has already been subjected to the calculation operation f2( ), the reader/writer 1 authenticates the IC card 3 (STEP 9).

Here, the authentication signal Rcb detected by the control circuit 6 is fed to the calculation circuit 8 so as to be subjected to the calculation operation f1( ). The signal obtained by subjecting the authentication signal Rcb to the calculation operation f1( ) is, as an authentication signal Rcc, fed to the control circuit 6 (STEP 10). However, if the authentication process in STEP 9 results in "NG", the reader/writer 1 does not communicate with the controller 2; if this authentication process results in "OK", the user ID ID0 detected by the control circuit 6 is fed to the main control circuit 9 of the controller 2 (STEP 11), and the memory ID ID1 that is stored in the memory 10 so as to correspond to that user ID ID0 and that will be used to permit the use of the memory area 17-1 of the IC card 3 is read (STEP 12). Then, the controller 2 feeds the memory ID ID1 read from the memory 10 from its main control circuit 9 to the control circuit 6 of the reader/writer 1 (STEP 13).

Here, if the authentication process performed by the authentication circuit 7 results in "OK", the control circuit 6 feeds the modulation/demodulation circuit 5 with a command signal Cb to which the memory ID ID1, the authentication signal Rcc, and a signal requesting the use of the memory area 17-1 are added; if the authentication process performed by the authentication circuit 7 results in "NG", or if no user ID ID0 is stored in the memory 10, the control circuit 6 feeds the modulation/demodulation circuit 5 with a command signal Cb1 to which the authentication signal Rcc is added (STEP 14). The command signal Cb or Cb1 thus produced by the control circuit 6 is then fed to the modulation/demodulation circuit 5, and is then transmitted from the tuning circuit 4 (STEP 15).

When the IC card 3 receives the command signal Cb through its tuning circuit 11, the rectifier circuit 12 produces a source voltage therefrom, and the modulation/demodulation circuit 13 demodulates and feeds it to the control circuit 14. The control circuit 14 detects the authentication signal Rcc and the memory ID ID1 added to the command signal Cb, and recognizes that the reader/writer 1 will use the memory area 17-1 (STEP 16). Then, the authentication signal Rcc is fed to the authentication circuit 15 to check whether or not this authentication signal Rcc has already been subjected to the calculation operation f1( ) within the reader/writer 1. It is to be noted that, although not shown in the time chart of FIG. 2, when the IC card 3 receives the command signal Cb1, the reader/writer 1, the controller 2, and the IC card 3 repeat the operations starting with STEP 3. Here, since it is assumed that the IC card 3 has received the command signal Cb, the authentication circuit 15 checks whether the reader/writer 1 is authentic or not on the basis of the authentication signal Rcc (STEP 17).

Here, if the authentication process results in "OK", the control circuit 14 compares the memory ID received from the reader/writer 1 with the memory ID stored in the memory area 17-1 within the memory 17 to check whether they coincide or not (STEP 18). The operation flow then proceeds, if the two memory IDs coincide, to STEP 20 and, otherwise, to STEP 19. On the other hand, if the authentication process in STEP 17 results in "NG", or if the two memory IDs do not coincide in STEP 18, the authentication signal Rcc detected by the control circuit 14 is fed to the calculation circuit 16 so as to subject it to the calculation operation f2( ). The signal f2(Rcc) obtained by subjecting the authentication signal Rcc to the calculation operation f2( ) is, as an authentication signal Rcd, fed to the control circuit 14 (STEP 19), and then the operation flow proceeds to STEP 20.

When the operation flow, on completion of the operation in STEP 18 or 19, proceeds to STEP 20, the control circuit 14 produces, if the authentication process results in "OK", a response signal Rb for notifying the reader/writer 1 that communication is possible or, if the authentication process results in "NG", a response signal Rb1 to which the authentication signal Rcd and the user ID ID0 are added, and feeds the produced signal to the modulation/demodulation circuit 13. Here, since the authentication signal Rcc=f1(Rcb), and the memory ID received from the reader/writer 1 is ID1 and thus coincides with the memory ID of the memory area 17-1, the response signal Rb for notifying the reader/writer 1 that communication is possible is produced in STEP 20. When the response signal Rb or Rb1 is fed to the modulation/demodulation circuit 13, it is modulated thereby and is then transmitted from the tuning circuit 11 (STEP 21).

When the reader/writer 1 receives the response signal Rb through its tuning circuit 4, the modulation/demodulation circuit 5 demodulates and feeds it to the control circuit 6. In response to the response signal Rb, the control circuit 6 permits access to the memory area 17-1 within the IC card 3, and recognizes that communication is now possible (STEP 22). It is to be noted that, although not shown in the time chart of FIG. 2, when the reader/writer 1 receives the response signal Rb1, the reader/writer 1, the controller 2, and the IC card 3 repeat the operations starting with STEP 8.

Here, it is assumed that the reader/writer 1 has received the response signal Rb, and therefore the control circuit 6 then makes the main control circuit 9 of the controller 2 recognize that communication is now possible with the IC card 3 (STEP 23). On recognizing that communication is possible with the IC card 3, the controller 2 communicates with the IC card 3 through the reader/writer 1, and, meanwhile, data is read from or written to the memory area 17-1 of the IC card 3 (STEP 24).

Figure 6:
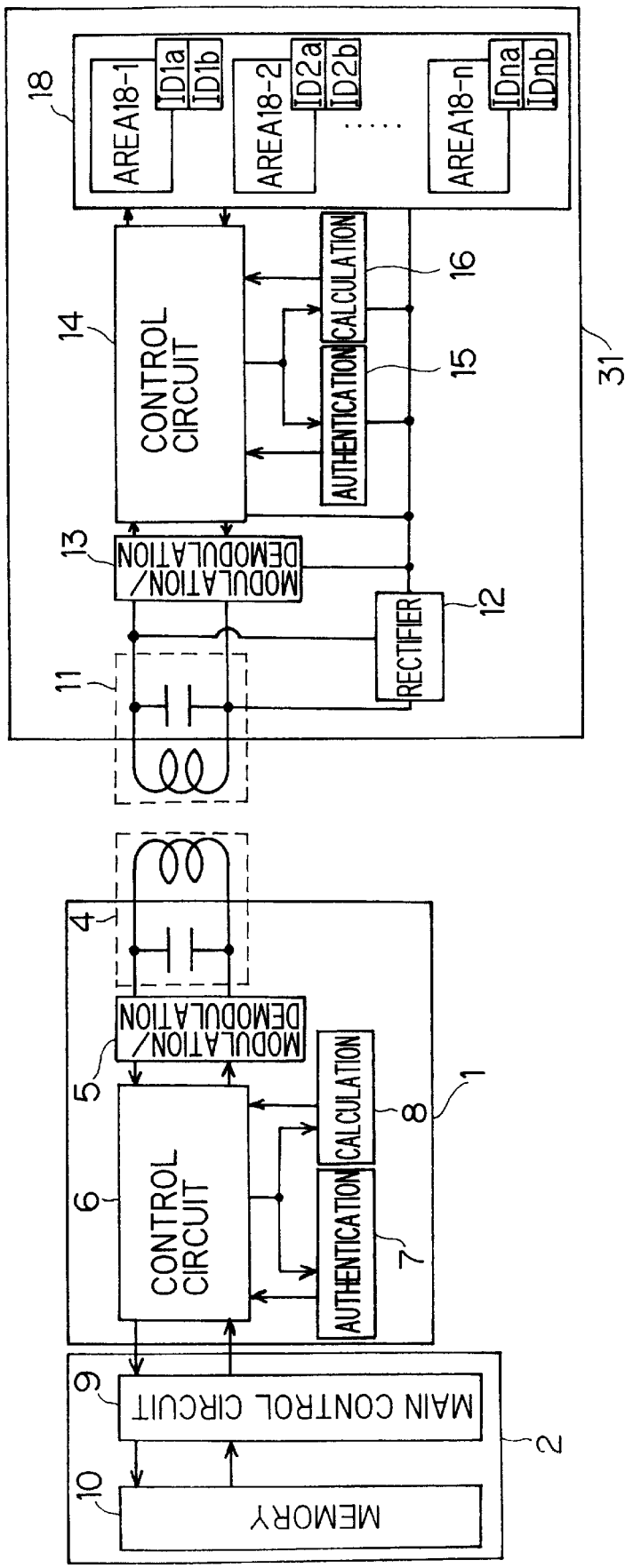
FIG. 6 is a block diagram showing the configuration of the communications system of a second embodiment of the invention.

Next, a second embodiment of the present invention will be described with reference to the drawings relevant thereto. FIG. 6 is a block diagram showing the configuration of the communications system of this embodiment. FIG. 7 is a time chart showing the operation of the communications system of this embodiment. In the communications system of this embodiment, the reader/writer and the controller shown in FIG. 6 have the same internal configuration as the reader/writer 1 and the controller 2 in the communications system shown in FIG. 1. Moreover, in the block constituting the IC card in FIG. 6, such elements as are found also in the IC card 3 in the communications system shown in FIG. 1 are identified with the same reference numerals and symbols, and their detailed descriptions will not be repeated.

The IC card 31 shown in FIG. 6 has a memory 18 divided into memory areas 18-1 to 18-n, a tuning circuit 11, a rectifier circuit 12, a modulation/demodulation circuit 13, a control circuit 14, an authentication circuit 15, and a calculation circuit 16. This IC card 31, like the IC card 3 in the first embodiment, can communicate with a plurality of reader/writers managed by different providers, and thus has its memory 18 divided into memory areas 18-1 to 18-n that are allocated for access from the individual providers.

In the memory areas 18-1 to 18-n are stored ID numbers (hereinafter the "user IDs") ID1a to IDna that are used to permit each ID card 3 to be identified by the individual providers and ID numbers (hereinafter the "memory IDs") ID1b to IDnb that are used to permit access to the memory areas 18-1 to 18-n. Thus, the user IDs ID1a to IDna and the memory IDs ID1b to IDnb are stored in the memory 18. The user IDs ID1a to IDna and the memory IDs ID1b to IDnb are determined so as to be unique to each IC card 31 by the individual providers after the manufacture of the IC card 31.

Figure 8A:
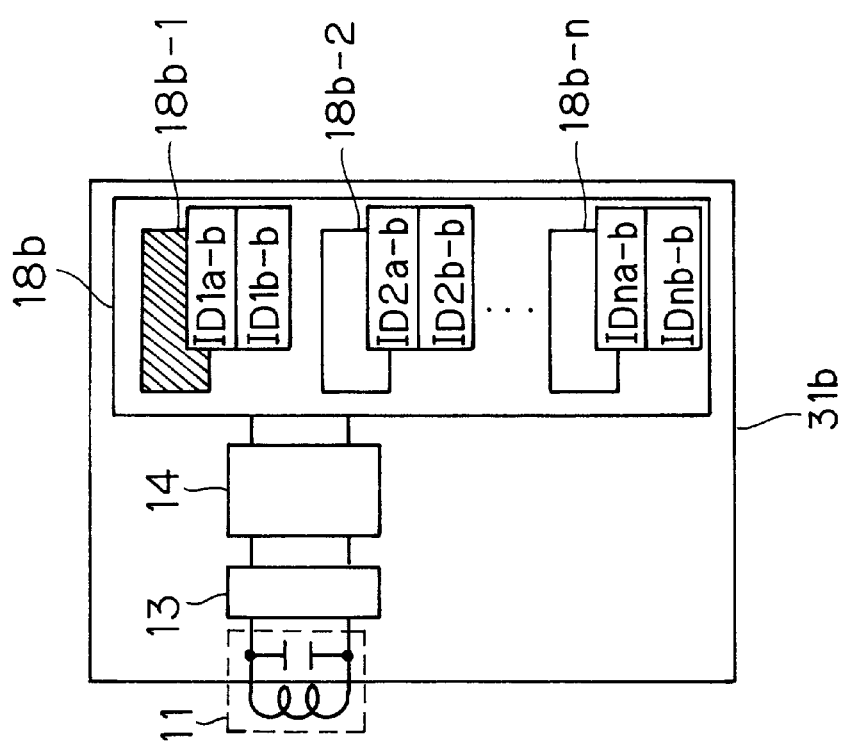
FIGS. 8A and 8B are block diagrams showing the relationship between different IC cards employed in the communications system shown in FIG. 6.
Figure 8B:
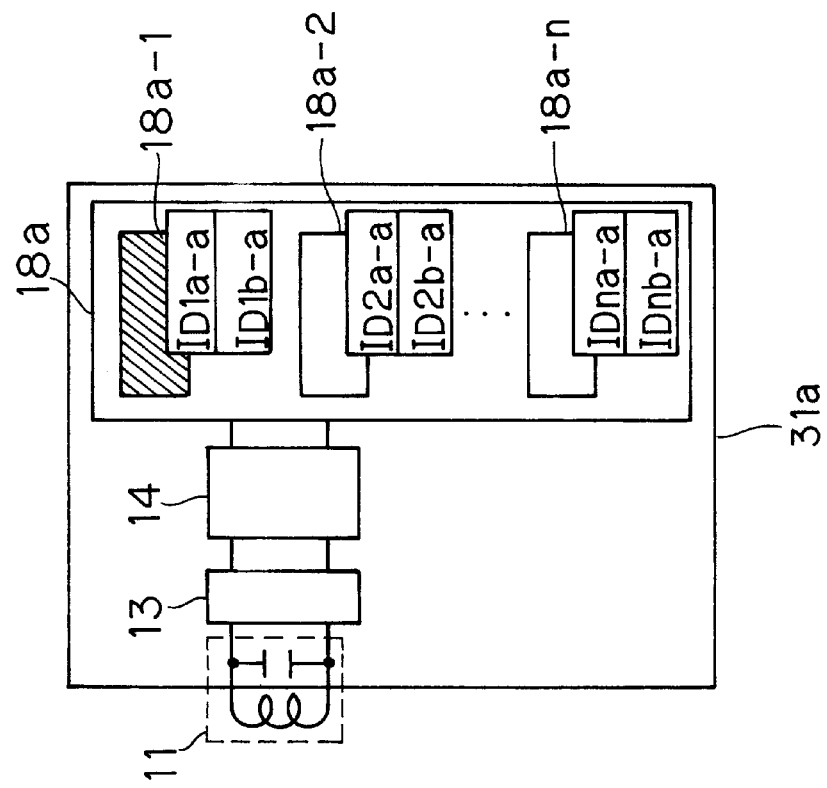
Figure 9:
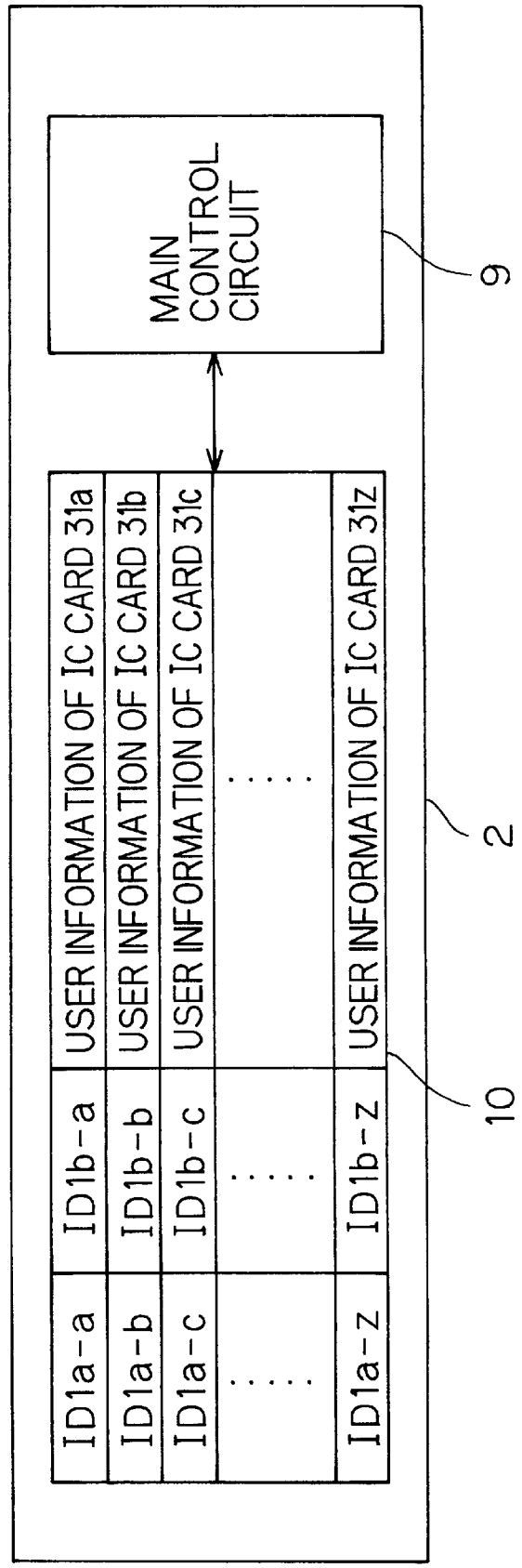
FIG. 9 is a block diagram showing the internal configuration of the controller and the memory employed in the communications system shown in FIG. 6.

Moreover, if it is assumed that, as shown in FIGS. 8A and 8B, a provider B, when communicating with an IC card 31a, uses the memory area 18a-1 within the memory 18a and, when communicating with an IC card 31b, uses the memory area 18b-1 within the memory 18b, then, as shown in FIG. 9, in the memory 10 of the controller 2, the user ID ID1a—a and the memory ID ID1b-a of the IC card 31a are stored as one set of mutually related data, and the user ID ID1a—b and the memory ID ID1b—b of the IC card 31b are stored as another set of mutually related data.

The operation of this communications system will be described below with reference to FIG. 7. It is to be noted that, in the following descriptions, such operations as are found also in FIG. 2 are indicated as such, and their detailed descriptions will not be repeated. First, in STEPs 1a and 2a, the reader/writer 1 performs the same operations as in STEPs 1 and 2 shown in FIG. 2 to transmit a command signal C1 having an authentication signal Rc1 added thereto to the IC card 31. Here, the command signal C1 has also a signal requesting access to the memory area 18-1 added thereto.

When the IC card 31 receives this command signal C1 through its tuning circuit 11, then, in STEP 3a, the control circuit 14 recognizes that the reader/writer 1 is requesting access to the memory area 18-1 and also, as in STEP 3 in FIG. 2, detects the authentication signal Rc1 and feeds it to the authentication circuit 15. Then, in STEPs 4a and 5a, the same operations as in STEPs 4 and 5 in FIG. 2 are performed.

Then, the control circuit 14 adds to a response signal RI the authentication signal Rc2=f2(Rc1) produced by the calculation circuit 16 on the basis of the authentication signal Rc1, and adds thereto also the user ID ID1a of the memory area 18-1 read from the memory 18 (STEP 6a). The response signal R1 thus produced is modulated by the modulation/demodulation circuit 13 and is then transmitted from the tuning circuit 11 to the reader/writer 1 (STEP 7a).

When the reader/writer 1 receives this response signal R1 through its tuning circuit 4, then, in STEPs 8a to 14a, the same operations as in STEPs 8 to 14 in FIG. 2 are performed. Specifically, the control circuit 6 detects the user ID ID1a and the authentication signal Rc2 added to the response signal R1, and then the authentication circuit 7 performs an authentication process on the basis of the authentication signal Rc2. Here, if the authentication process results in "NG", the reader/writer 1 does not communicate with the controller 2; instead, the operation flow proceeds to STEP 10a, so that an authentication signal Rc3=f1(Rc2) is produced by the calculation circuit 8, and then a command signal C2a is produced to which the authentication signal Rc3 is added. On the other hand, if the authentication process results in "OK", the operation flow proceeds to STEP 11a, so that the controller 2 reads, within the memory 10, the memory ID ID1b that corresponds to the user ID ID1a and feeds it to the reader/writer 1, and then a command signal C2 is produced to which the authentication signal Rc3 produced by the calculation circuit 8 and the memory ID ID1b are added. When there is no user ID ID1a in the memory 10, the control circuit 6 produces the command signal C2a mentioned above.

When the command signal C2 or C2a is produced in this way, this command signal is transmitted to the IC card 31 (STEP 15a). Here, since the authentication signal Rc2=f2 (Rc1) has already been subjected to the calculation operation f2( ), the reader/writer 1 authenticates the IC card 31. Thus, the command signal C2 is transmitted to the IC card 31.

The operations performed in STEP 16a and the following steps are almost the same as those performed in STEP 16 and the following steps in FIG. 2 except that different symbols are used. Therefore, the descriptions of those steps will be given below in simplified form.

When the IC card 31 receives the command signal C2, the control circuit 14 detects the authentication signal Rc3 and the memory ID ID1b added to the command signal C2 (STEP 16a). It is to be noted that, if the IC card 31 receives the command signal C2a here, just as in the first embodiment, the reader/writer 1, the controller 2, and the IC card 31 repeat the operations starting with STEP 3a. Then, the authentication circuit 15 checks whether or not the authentication signal Rc3 has already been subjected to the calculation operation f1( ) within the reader/writer 1 to check whether the reader/writer 1 is authentic or not (STEP 17a).

Here, if the authentication process results in "OK", the control circuit 14 compares the memory ID received from the reader/writer 1 with the memory ID stored in the memory area 18-1 to check whether they coincide or not (STEP 18a), and then the operation flow proceeds, if the two memory IDs coincide, to STEP 20a and, otherwise, to STEP 19a. On the other hand, if the authentication process in STEP 17a results in "NG", or if the two memory IDs do not coincide in STEP 18a, the authentication signal Rc3 detected by the control circuit 14 is fed to the calculation circuit 16. In this case, the calculation circuit 16 produces an authentication signal Rc4=f2(Rc3) (STEP 19a), and then the operation flow proceeds to STEP 20a.

When the operation flow, on completion of the operation in STEP 18a or 19a, proceeds to STEP 20a, the control circuit 14 produces, if the authentication process results in "OK", a response signal R2 for notifying the reader/writer 1 that communication is possible or, if the authentication process results in "NG", a response signal R2a to which the authentication signal Rc4 and the user ID ID1a are added, and feeds the produced signal to the reader/writer 1. Here, since the authentication signal Rc3=f1(Rc2), and the memory ID received from the reader/writer 1 is ID1b and thus coincides with the memory ID of the memory area 18-1, the response signal R2 for notifying the reader/writer 1 that communication is possible is transmitted in STEP 21a.

When the reader/writer 1 receives the response signal R2, the control circuit 6, on the basis of the response signal R2, permits access to the memory area 18-1 within the IC card 31, and recognizes that communication is now possible (STEP 22a). It is to be noted that, just as in the first embodiment, when the reader/writer 1 receives the response signal R2a, the reader/writer 1, the controller 2, and the IC card 31 repeat the operations starting with STEP 8a.

Here, it is assumed that the reader/writer 1 has received the response signal R2, and therefore the control circuit 6 then makes the main control circuit 9 of the controller 2 recognize that communication is now possible with the IC card 31 (STEP 23a). On recognizing that communication is possible with the IC card 31, the controller 2 communicates with the IC card 31 through the reader/writer 1, and, meanwhile, data is read from or written to the memory area 18-1 of the IC card 31 (STEP 24a).

In both of the first and second embodiments, if authentication processes are performed a plurality of times between the reader/writer and the IC card and no authentication results, then an error-message is transmitted to the controller and communication is terminated. Similarly, if verification of an ID number is performed a plurality of times in the IC card or in the controller and the ID is found to be coincident with none stored, then an error message is transmitted to the controller and communication is terminated.

Figure 10:
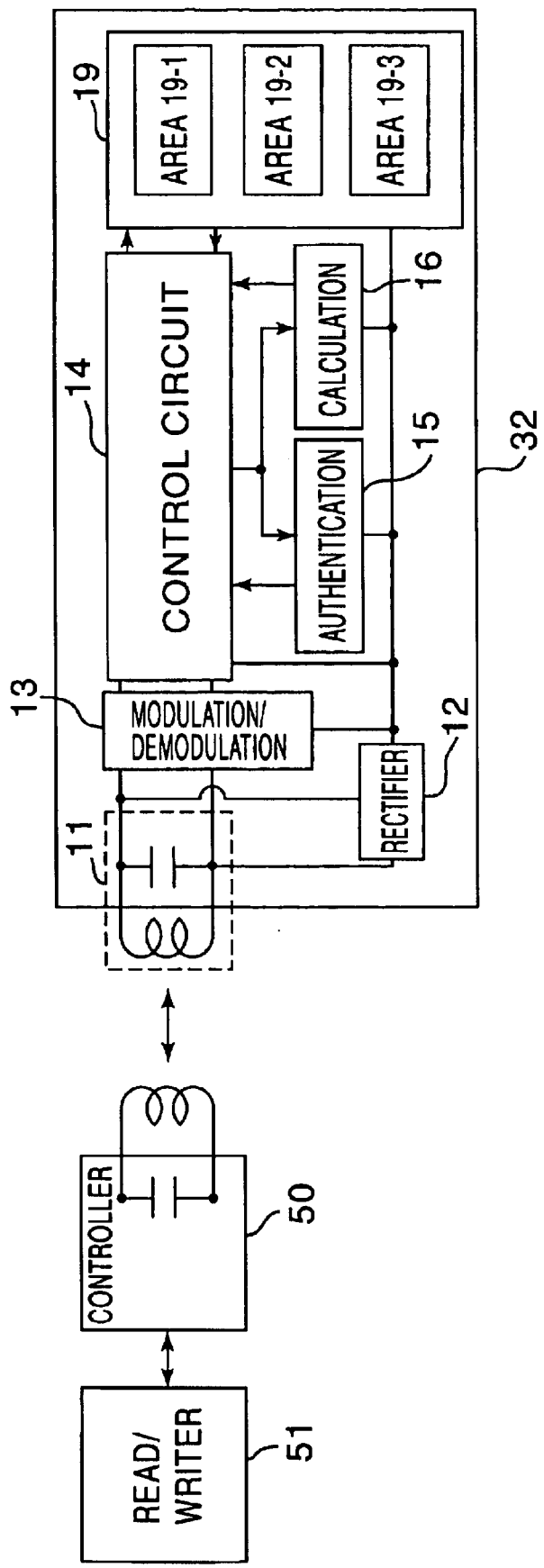
FIG. 10 is a block diagram showing the configuration of the communications system of a third embodiment of the invention.
Figure 11:
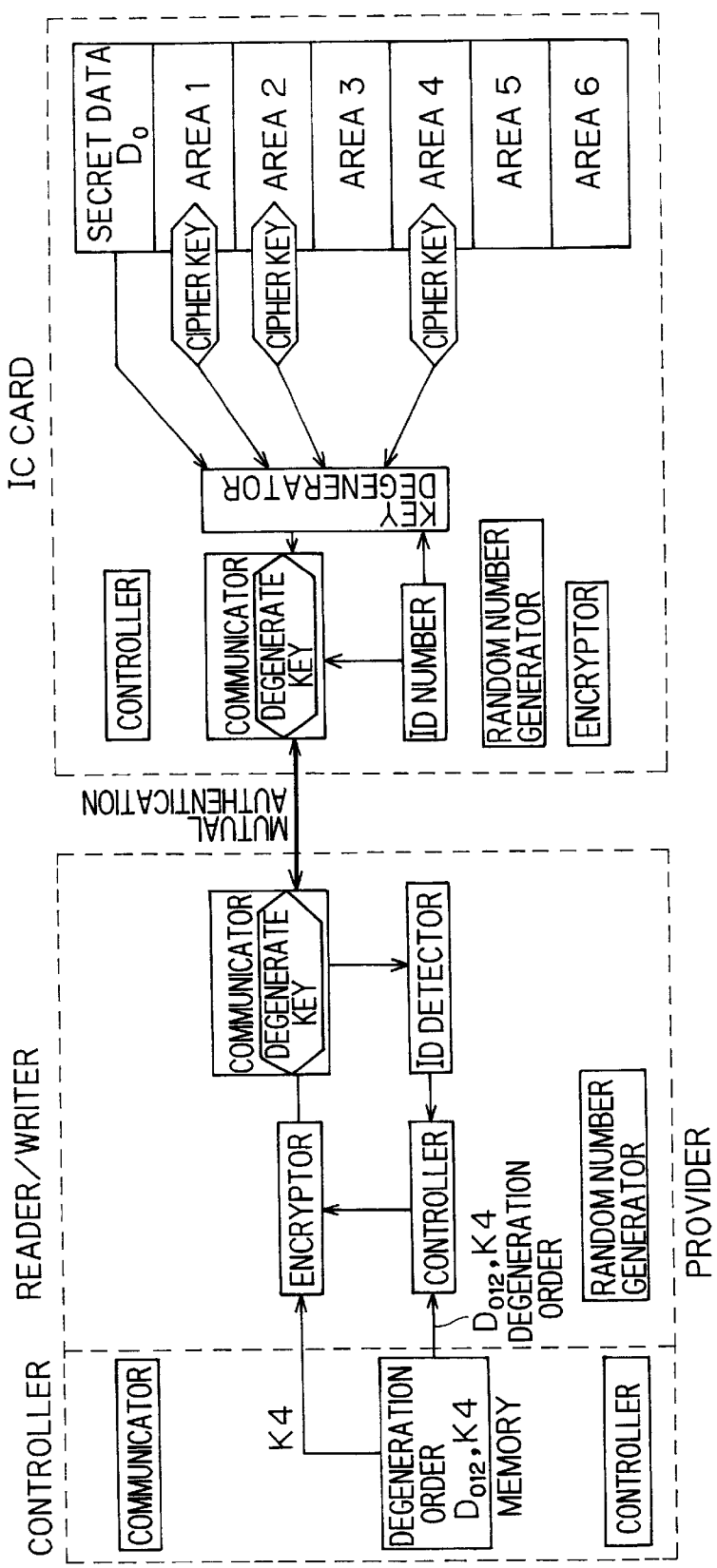
FIG. 11 is a block diagram showing the configuration of a conventional communications system.

Next, a third embodiment of the present invention will be described with reference to the drawings relevant thereto. FIG. 10 is a block diagram showing the configuration of the communications system of this embodiment. In the communications system of this embodiment, the reader/writer and the controller shown in FIG. 10 have the same internal configuration as the reader/writer 1 and the controller 2 in the communications system shown in FIG. 1. Moreover, in the block constituting the IC card in FIG. 10, such elements as are found also in the IC card 3 in the communications system shown in FIG. 1 are identified with the same reference numerals and symbols, and their detailed descriptions will not be repeated.

The IC card 32 shown in FIG. 10 has a memory 19 divided into memory areas 19-1 to 19-3, a tuning circuit 11, a rectifier circuit 12, a modulation/demodulation circuit 13, a control circuit 14, an authentication circuit 15, and a calculation circuit 16. This IC card 32, like the IC card 3 in the first embodiment, can communicate with a plurality of reader/writers managed individually by different providers C1, C2, and C3, and thus has its memory 19 divided into memory areas 19-1 to 19-3 that are allocated for access from the individual providers C1, C2, and C3.

For example, the provider C1 handles the IC card 32 as a prepaid card for storing a count of points representing an amount of money, and the IC card 32 incorporates, within its memory 19, a down counter (not shown) in which the count of points is stored in the form of a number of bits so as to be decreased according as the points are used. This down counter is initialized by a reset signal fed from the control circuit 14. Now, suppose that the IC card 32 is brought close to the reader/writer 50 managed by the provider C1, and, as the result of the authentication processes as performed in the first or second embodiments, the reader/writer 50 and the IC card 32 authenticate each other and access to the memory area 19-1 is permitted, making it possible for the controller 51 and the IC card 32 to communicate with each other through the reader/writer 50.

Now, a description will be given of how this system works when the user D of the IC card 32 uses the IC card 32 to pay bills, for example, at a gas station. First, the data of the number of remaining points for the user D stored in the memory (not shown) provided within the controller 51 is added to a command signal requesting the reading of the number of bits stored in the down counter, and this command signal is transmitted from the controller 51 through the reader/writer 50 to the IC card 32. Here, the controller 51 calculates the number of remaining points for the user D after the payment, and stores the result in the main control circuit (not shown).

When the IC card 32 receives this command signal, the control circuit 14 feeds the memory area 19-1 with a signal requesting the down counter to be enabled to be read. When the memory area 19-1 receives this signal, the down counter is enabled to be read, and the control circuit 14 counts the number of bits stored therein. Moreover, the control circuit 14 compares the number of remaining points for the user D stored in the memory within the controller 51 and added to the command signal with the number of points detected from a response signal to check whether they coincide or not. If the two numbers coincide, the control circuit 14 transmits through the reader/writer 50 to the controller 51 a response signal indicating the coincidence of the two numbers.

When the controller 51 receives this response signal, it transmits through the reader/writer 50 to the IC card 32 a command signal requesting the number of bits stored in the down counter to be decreased by the number of bits corresponding to the bill to be paid. Here, the controller 51 calculates the number of remaining points for the user D after the payment, and stores the result in the main control circuit (not shown). When the IC card 32 receives this command signal, the control circuit 14 feeds the memory area 19-1 with a signal requesting the down counter to be enabled to be written. When the memory area 19-1 receives this signal, the down counter is enabled to be written, and the number of bits stored in the down counter is decreased by the number of bits detected from the command signal.

When some of the remaining points are deleted in this way, the control circuit 14 calculates the number of bits stored in the down counter after the deletion, and a response signal to which the data of the number of points corresponding to that number of bits is added is transmitted through the reader/writer 50 to the controller 51. The controller 51 compares the number of points stored in the main control circuit with the number of points detected from the response signal, and, when they coincide, it transmits a command signal indicating the coincidence of the two numbers to the IC card 32, and stores this number in the memory of the controller 51. Then, the controller 51 terminates communication.

Next, a description will be given of how this system works when, after the IC card 32 and the reader/writer 50 have authenticated each other to make it possible for them to communicate with each other, the user D deposits money to increase the number of remaining points. First, the data of the number of remaining points for the user D stored in the memory provided within the controller 51 is added to a command signal requesting the reading of the number of bits stored in the down counter, and this command signal is transmitted from the controller 51 through the reader/writer 50 to the IC card 32.

When the IC card 32 receives this command signal, the control circuit 14 feeds the memory area 19-1 with a signal requesting the down counter to be enabled to be read. When the memory area 19-1 receives this signal, the down counter is enabled to be read, and the control circuit 14 counts the number of bits stored therein. Moreover, the control circuit 14 compares the number of remaining points for the user D stored in the memory within the controller 51 and added to the command signal with the number of points detected from a response signal to check whether they coincide or not. If the two numbers coincide, the control circuit 14 transmits through the reader/writer 50 to the controller 51 a response signal indicating the coincidence of the two numbers.

When the controller 51 receives this response signal, it transmits through the reader/writer 50 to the IC card 32 a command signal requesting the number of bits stored in the down counter to be changed to a number corresponding to the number of points after the depositing of money. Here, the controller 51 calculates the number of remaining points for the user D after the depositing, and stores the result in the main control circuit. When the IC card 32 receives this command signal, the control circuit 14 feeds the memory area 19-1 with a signal requesting the down counter to be enabled to be written. When the memory area 19-1 receives this signal, the down counter is enabled to be written. Thereafter, the control circuit 14 first feeds the down counter with a reset signal to initialize it, and then decreases the number of bits stored in the down counter until it becomes equal to the number of bits detected from the command signal.

When the number of remaining points is changed in this way, the control circuit 14 calculates the number of bits stored in the down counter after the change, and a response signal to which the data of the number of points corresponding to that number of bits is added is transmitted through the reader/writer 50 to the controller 51. The controller 51 compares the number of points stored in the main control circuit with the number of points detected from the response signal, and, when they coincide, it transmits a command signal indicating the coincidence of the two numbers to the IC card 32, and stores this number in the memory of the controller 51. Then, the controller 51 terminates communication.

The embodiments described above all deal with transponders for data communication, such as IC cards, that achieve communication on a non-contact basis. However, the present invention is applicable also to transponders for data communication that achieve communication on a wired (i.e. direct-contact) basis. In that case, instead of using tuning circuits as are used in the first to third embodiments to exchange signals, input/output interfaces are provided in the transponder and the interrogator to allow them to communicate with each other.

According to the present invention, in a transponder for data communication, key signals that are used to permit the use of storage areas are determined so as to be unique to the transponder so that the use of the storage areas will be permitted on the basis of those key signals. By the use of this transponder for data communication, it is possible to build a communications system that offers higher security. Moreover, this transponder for data communication is provided with an authentication circuit for producing a signal requesting an interrogator to permit communication therewith, and therefore no communication is possible unless the interrogator authenticates the transponder. Thus, it is possible to realize a communications system that offers higher security.

What is claimed is:

1. A transponder for data communication, comprising:

a plurality of storage areas for storing data used when the transponder communicates individually with a plurality of interrogators managed by different managing parties, the storage areas corresponding one-to-one to the different managing parties;

a plurality of storage-area-specific key signals, unique to the transponder and stored so as to correspond one-to-one to the storage areas, for permitting use of only a particular storage area corresponding to an interrogator with which the transponder is currently communicating;

a device-specific key signal for distinguishing the transponder from another transponder;

an authentication circuit for checking whether the interrogator is authentic or not on a basis of a first authentication signal that is generated in the interrogator by performing a calculation operation according to a first calculation formula on a second authentication signal included in a response signal transmitted from the transponder, which is added to a command signal transmitted from the interrogator; and a calculation circuit for generating, by performing a calculation operation according to a second calculation formula on the first authentication signal, a second authentication signal with which to request the interrogator to authenticate the transponder, wherein, when the transponder receives the command signal from the interrogator, if the first authentication signal included in the command signal is not one generated on a basis of the second authentication signal included in the response signal from the transponder, the transponder, in the authentication circuit, does not authenticate the interrogator, but in the calculation circuit, generates the second authentication signal from the first authentication signal according to the second calculation formula, and transmits to the interrogator the response signal including the second authentication signal and the device-specific key signal, and if the first authentication signal included in the command signal is one generated on a basis of the second authentication signal included in the response signal from the transponder, the transponder, in the authentication circuit, authenticates the interrogator, and checks whether or not the storage-area-specific key signal included in the command signal coincides with the storage-area-specific key signal stored so as to correspond to a specific storage area allocated to the managing party that manages the interrogator so that, if the two storage-area-specific key signals coincide with each other, the transponder becomes communicable with the interrogator by using only that specific storage area.

2. A transponder for data communication as claimed in claim 1,
   wherein the device-specific key signal is common to all the managing parties, and there is stored only one device-specific key signal.

3. A transponder for data communication as claimed in claim 1,
   wherein, for the different managing parties, different device-specific key signals are stored so as to correspond to the storage areas.

4. A transponder for data communication as claimed in claim 1,
   wherein at least one of the storage areas is composed of a count storage member in which a count is stored that is updated in response to a count updating command transmitted from the interrogator when the transponder communicates with the interrogator by using that storage area.

5. A transponder for data communication as claimed in claim 4,
   wherein the device-specific key signal is common to all the managing parties, and there is stored only one device-specific key signal.

6. A transponder for data communication as claimed in claim 4,
   wherein, for the different managing parties, different device-specific key signals are stored so as to correspond to the storage areas.

7. A transponder for data communication, as claimed in claim 1,
   wherein, when the transponder receives a radio wave from the interrogator, the transponder starts up by using electric power of the radio wave and starts an authentication operations.

8. A non-contact communications system, comprising:
   a plurality of interrogators each including:
      a first authentication circuit for checking whether a transponder is authentic or not on a basis of a second authentication signal included in a response signal from the transponder;
      a first calculation circuit for generating a first authentication signal by performing a calculation operation according to a first calculation formula on the second authentication signal; and
      a memory for storing a device-specific key signal and a plurality of storage-area-specific key signals for each of different transponders;
      the interrogators each transmitting a command signal including the first authentication signal and the storage-area-specific key signal;
      the interrogators being managed by different managing parties; and
   a plurality of transponders each including:
      a plurality of storage areas for storing data used when the transponder communicates individually with the interrogators, the storage areas corresponding one-to-one to the different managing parties;
      the plurality of storage-area-specific key signals, unique to the transponder and stored so as to correspond one-to-one to the storage areas, for permitting use of only a particular storage area corresponding to a particular interrogator with which the transponder is currently communicating;
      the device-specific key signal for distinguishing the transponder from another transponder;
      a second authentication circuit for checking whether the interrogator is authentic or not on a basis of the first authentication signal added to the command signal; and
      a second calculation circuit for generating, by performing a calculation operation according to a second calculation formula on the first authentication signal, a second authentication signal with which to request the interrogator to authenticate the transponder itself;
      the transponder transmitting the response signal including the second authentication signal and the device-specific key signal,
   wherein, when the transponder receives the command signal from the interrogator,
      if the first authentication signal included in the command signal is not one generated on a basis of the second authentication signal included in the response signal from the transponder, the transponder, in the second authentication circuit, does not authenticate the interrogator, but in the second calculation circuit, generates the second authentication signal from the first authentication signal according to the second calculation formula, and transmits to the interrogator the response signal including the second authentication signal and the device-specific key signal, and
      if the first authentication signal included in the command signal is one generated on a basis of the second authentication signal included in the response signal from the transponder, the transponder, in the second authentication circuit, authenticates the interrogator, and checks whether or not the storage-area-specific key signal included in the command signal coincides with the storage-area-specific key signal stored so as to correspond to a specific storage area allocated to the managing party that manages the interrogator so that, if the two storage-area-specific key signals coincide with each other, the transponder becomes communicable with the interrogator by using only that specific storage area, and
   when the interrogator receives the response signal from the transponder,
      if the second authentication signal included in the response signal is one generated on a basis of the first authentication signal included in the command signal from the interrogator, the interrogator, in the first authentication circuit, authenticates the transponder, and in the first calculation circuit, generates the first authentication signal from the second authentication signal according to the first calculation formula, and confirms the storage-area-specific key signal corresponding to the device-specific key signal included in the response signal, and transmits to the transponder the command signal including the first authentication signal and the storage-area-specific key signal.

9. A non-contact communications system as claimed in claim 8,
   wherein the transponder stores only one device-specific key signal as common to all the managing parties.

10. A non-contact communications system as claimed in claim 8,
    wherein the transponder stores different device-specific key signals for the different managing parties as corresponding to the storage areas.

11. A non-contact communications system as claimed in claim 8,
    wherein, in the transponder, at least one of the storage areas is composed of a count storage member in which a count is stored that is updated in response to a count updating command transmitted from the interrogator when the transponder communicates with the interrogator by using that storage area.

12. A non-contact communications system as claimed in claim 11, wherein the transponder stores only one device-specific key signal as common to all the managing parties.

13. A non-contact communications system as claimed in claim 11, wherein the transponder stores different device-specific key signals for the different managing parties as corresponding to the storage areas.

14. A non-contact communications system, as claimed in claim 8, wherein, when the transponder receives a radio wave from the interrogator, the transponder starts up by using electric power of the radio wave and starts an authentication operations.

* * * * *